United States Patent [19]

Perfect, deceased

[11] Patent Number: 5,364,587
[45] Date of Patent: Nov. 15, 1994

[54] NICKEL ALLOY FOR HYDROGEN BATTERY ELECTRODES

[75] Inventor: Frederick H. Perfect, deceased, late of Wyomissing, Pa., by Marjorie L. Perfect, executor

[73] Assignee: Reading Alloys, Inc., Robesonia, Pa.

[21] Appl. No.: 919,171

[22] Filed: Jul. 23, 1992

[51] Int. Cl.$^5$ .............................................. B22F 3/12
[52] U.S. Cl. .................................... 419/31; 419/32; 419/33; 419/38; 419/45; 419/46; 419/49; 420/494; 420/446; 420/447
[58] Field of Search .................... 75/10.65, 122, 175.5, 75/232; 148/421; 419/19, 29, 31, 32, 33, 34, 39, 46, 55, 57, 60; 420/3, 319, 424, 428, 552, 494, 446, 447; 429/94, 101

[56] References Cited

U.S. PATENT DOCUMENTS

| | | | |
|---|---|---|---|
| 2,678,269 | 10/1951 | Ham et al. | 75/176 |
| 2,678,272 | 10/1951 | Ham et al. | 75/176 |
| 2,819,960 | 11/1956 | Bomberger | 75/175.5 |
| 2,821,475 | 1/1958 | Jaffee et al. | 75/175.5 |
| 2,850,385 | 9/1958 | Nisbet | 75/176 |
| 2,938,789 | 5/1960 | Jaffee | 75/175.5 |
| 3,110,589 | 7/1961 | Bechtold | 75/175.5 |
| 3,370,946 | 2/1968 | Bertea et al. | 75/175.5 |
| 3,508,910 | 4/1970 | Findley et al. | 75/122 |
| 3,645,727 | 2/1972 | Findley et al. | 75/175.5 |
| 3,982,924 | 9/1976 | Perfect | 75/0.5 |
| 4,104,059 | 8/1978 | Perfect | 75/134 |
| 4,119,457 | 10/1978 | Perfect | 75/134 |
| 4,292,077 | 9/1981 | Blackburn et al. | 75/175.5 |
| 4,331,475 | 5/1982 | Perfect | 420/428 |
| 4,374,667 | 2/1983 | Perfect | 420/424 |
| 4,551,400 | 11/1985 | Sapru et al. | 429/94 |
| 4,605,436 | 8/1986 | Andörfer | 75/10.65 |
| 4,623,597 | 11/1986 | Sapru et al. | 429/101 |
| 4,634,478 | 1/1987 | Shimogori et al. | 148/421 |
| 4,728,586 | 3/1988 | Vankatesan et al. | 429/94 |
| 4,738,822 | 4/1988 | Bania | 420/419 |
| 5,196,048 | 3/1993 | Antrim et al. | 75/315 |

OTHER PUBLICATIONS

Kirk-Othmer Encyclopedia of Chemical Technology, "Thermite", vol. 5, p. 404, 3rd ed., 1979.
Combustion and Plasma Synthesis of High ∝ Temperature Materials, Dunmead et al., "Combustion Synthesis in the Ti-C-Ni-AI System", pp. 229-232, 1990.

Primary Examiner—Donald P. Walsh
Assistant Examiner—John N. Greaves
Attorney, Agent, or Firm—Eckert Seamans Cherin & Mellott

[57] ABSTRACT

Master alloys and methods of producing same are disclosed, wherein an intermetallic compound is first prepared via thermite processing, then size reduced, then mixed with other components in amounts yielding a mixture in the desired proportion for the master alloy. The mixture is compacted, then heated to produce the master alloy, which is used for making Nickel-based alloys used, (for example), in hydrogen battery electrodes.

20 Claims, No Drawings

NICKEL ALLOY FOR HYDROGEN BATTERY ELECTRODES

FIELD OF THE INVENTION

The present invention relates to master alloys, particularly alloys used in making alloys for hydrogen storage batteries and methods of making of such master alloys.

BACKGROUND OF THE INVENTION

Titanium-containing alloys find a broad range of applications in areas where low weight and strength are required, such as aerospace and military uses, as well as corrosion resistance and heat applications, including use in turbine blade jet engine parts, high speed cutting tools, and so on. Molybdenum is known to be difficult to diffuse uniformly in titanium, because of its higher melting point and higher density, which causes molybdenum particles to drop to the bottom of a molten titanium pool where they sinter into agglomerates and form inclusions in the ingot produced. See, e.g., U.S. Pat. No. 3,508,910. The same problems of getting molybdenum to homogenize with titanium are also experienced with columbium, which like molybdenum, is also highly refractory.

Matters are further complicated by the fact that titanium alloys require relatively tight chemistries, and often the chemistry of the desired master alloy is poorly compatible with the homogenous alloying of the various components, due to differences in component solubility, melting point, density, etc. Furthermore, the chemistry of the alloy is frequently dictated by the alloying process used.

Other methods of melting master alloys have drawbacks as well. For example, induction melting of the components in graphite crucibles causes the resulting alloy to pick up carbon, an impurity which in some applications cannot be tolerated. Such methods are used, for example, in the alloying of metals for preparing electrodes for hydrogen storage batteries. See, e.g., U.S. Pat. No. 4,551,400.

An object of the invention is to produce an alloy having low residual aluminum.

Yet another object of the invention is to provide an alloy useful in the manufacture of electrodes for hydrogen storage batteries, the electrodes having low carbon content.

These and other advantages of the invention will become more readily apparent as the following detailed description of the invention proceeds.

SUMMARY OF THE INVENTION

The present invention comprises a method of making alloys, wherein an intermetallic compound(s) are first produced via thermite processing, then size reduced and mixed with powdered alloying components to form a mixture which is then compacted and fusion heated to prepare the desired end product.

Yet another embodiment of the invention comprises a method of preparing an alloy for use in hydrogen storage battery electrodes, comprising a predominant amount of nickel and lesser amounts of chromium, cobalt, iron, titanium, manganese, vanadium, and zirconium. In a highly preferred embodiment of the invention, a first mix containing oxides of vanadium, chromium and cobalt are mixed with powdered aluminum, iron, nickel and cobalt and heated using the thermite process to yield an intermetallic alloy comprising about 0–1% Al, 0–0.02% C, 8–18% Cr, 10–20% Co, 10–20% Fe, 8–18% Ni, 0–0.3% O, 0–0.02% P, 0–0.3% Si, and other trace elements, with V, about 33–48%. This alloy is then size reduced and mixed with sufficient amounts of powdered nickel, titanium, manganese and zirconium to yield a second mix which is compacted and fusion heated to produce an alloy comprising about 0–10% Cr, 0–10% Co, 0–10% Fe, 24–34% Ni, 7–17% Ti, 12–22% V and 17–35% Zr. This second mix is size reduced using known techniques (for example, hydriding).

DETAILED DESCRIPTION OF THE PREFERRED EMBODIMENTS

A master alloy is an alloy of selected elements that can be added to a charge of metal to provide a desired composition or to deoxidize one or more components of the mixture.

According to the present invention, an intermetallic compound is first prepared using thermite processing. Thermite processing involves an exothermic reaction which occurs when finely divided aluminum mixed with metal oxides is ignited, causing reduction of the oxide and reaching temperatures of about 2200° C., sufficient to propagate heat through the charge to homogenize the components comprising the resulting intermetallic compounds.

Often, a simple thermite process uses a mixture of powdered iron (III) oxide, $Fe_2O_3$ and powdered or granular aluminum. However, oxides of metals other than iron may be used, as discussed herein, and mixtures of these oxides may likewise be used.

In practicing the invention, the thermite components are charged to a furnace, typically a water-cooled, copper, below-ground reaction vessel, such as that described in "Metallothermic Reduction of Oxides in Water-Cooled Copper Furnaces," by F. H. Perfect, Transactions of the Metallurgical Society of AIME, Volume 239, August 1967, pp. 1282–1286. See also U.S. Pat. No. 4,104,059, incorporated by reference herein.

The mixture is thoroughly and intimately mixed prior to being charged to the furnace so the thermite reaction will occur rapidly and uniformly throughout the charge on ignition.

The reaction vessel is preferably covered after the mixture is charged and the pressure within the vessel may be reduced, for example, to about 0.3 mm Hg or less, followed by flooding the vessel with a high purity inert gas such as argon. Such evacuation and purging results in thermites of higher purity, and lower nitrogen content. The thermite reaction is initiated with an igniter and allowed to proceed to completion.

After the thermite is prepared using thermite processing, it is cooled and size reduced to powdered form using known methods, such as crushers, ball mills, pug mills, grinders, hydriding, etc.

After size reduction, the intermetallic compound produced by the thermite process, is then mixed with at least one additional metal in powdered form, for example, Ti, to form a substantially uniform mixture. The resulting mixture is then pressed into a compact or briquetted with application of pressures of over about 7,000 psi and preferably of about 15,000–30,000 psi. Typically, such compacts are formed using an isostatic press.

It is preferable, especially when forming large compacts, to place spacers at intervals within the compact in order to insure uniform compaction and produce more manageable compact sizes. Ten pound discs of compact are typically produced. The discs are then stacked in the furnace, and when the reaction starts, it tends to be semi-continuous and controlled rather than violent. The smaller compacts, when stacked, also help prevent melting of the compact, which is in some cases an undesirable result.

The compacts or briquets are then fused, preferably with induction heat, to form the desired master alloy. No special pressure conditions are required for the fusion, which is generally carried out at atmospheric or a milli tor pressure and temperatures of about 600°–1,700° C. depending on the optimal fusion temperature of the compact.

In yet another preferred embodiment of the invention, a master alloy for use in hydrogen storage battery electrodes is prepared via thermite processing. A charge of about 32–42% $V_2O_5$, 6–16% $Cr_2O_3$, 7–17% Co powder, 5–15% Ni powder, 7–17% Fe powder and 20–40% Al fines are mixed and ignited using thermite processing as previously discussed. As is known, calcium oxide, fluorspar and $NaClO_3$ may be added to the charge. The resulting master alloy preferably comprises about 8–18% Cr, 10–20% Co, 10–20% Fe, 8–18% Ni, 38–48% V and trace amounts (less than 1%) of Al, C, $N_2$, $O_2$, P, Si, S and other impurities. Most preferably, the resulting master alloy comprises about 12.9% Cr, 15.3% Co, 15% Fe, 12.9% Ni, 43.3% V and less than about 0.5% Al, C, $N_2$, $O_2$, P, Si, S and Ta.

The resulting master alloy is size reduced as previously discussed and then mixed with an appropriate amount of powdered metal to form a second mix which is compacted and fused by induction heating. This powdered metal preferably is selected from the group Ni, Ti, Mn and Zr and mixtures thereof. Preferably, the powdered metals comprise a mixture of about 20–30% Ni, 7–17% Ti and about 18–28% Zr, 0–5% Mn. Most preferably, the mixture of powdered metals added to the size reduced thermite comprises about 25 units Ni, 12 units Ti and 23 units Zr. The powdered metals and size reduced thermite are intimately mixed, compacted and fusion heated to yield an alloy of the general formula $Ti_x Zr_y V_z Ni_m Cr_n$, where the variables x, y, z, m and n may be as set forth in U.S. Pat. Nos. 4,728,586 and 4,551,400, incorporated by reference herein.

In a highly preferred embodiment of the invention, the resulting alloy comprises about 8–18% Ti, 17–27% Zr, 13–23% V, 24–34% Ni, 1–11% Cr, 1–11% Co and 1–11% Fe. A most preferred embodiment of the invention comprises about 12 5% Ti, 22% Zr, 17.5% V, 29.2% Ni, 5.3% Cr, 6.2% Co, and 6% Fe. When prepared using the combined thermite and fusion heating steps as described, it has been found that such an alloy contains very low carbon, as low as 0.025%, as little as one tenth that produced using prior art graphite crucible melting furnace techniques.

It is preferred to use alcohol to keep the mix from separating prior to compaction, as is known. As previously discussed, the resulting alloy may be hydrided to produce an end product in size reduced form, as is known.

EXAMPLE

It was desired to produce a master alloy for use in hydrogen storage battery electrode applications, the master alloy having about 29% Ni, 12% Ti, 17% V, 22% Zr, 5% Cr, 6% Co and 6% Fe. A thermite was first prepared by mixing 17 units of calcium oxide, 24 units of fluorspar, 7 units of $NaClO_3$, 42 units of aluminum fines, 12 units of iron powder, 10 units of nickel powder, 12 units of cobalt powder, 16 units of $Cr_2O_3$ and 67 units of $V_2O_5$. The mixture is reacted using thermite processing as described previously, and the resulting thermite was size reduced. 3,742 grams of this size reduced thermite were mixed with 2268 grams of powdered nickel, 1089 grams of powdered titanium, 2077 grams of powdered zirco-nium and 75 ml of alcohol, and the mixture was mixed, compacted and fusion treated to produce a product which was hydrided as described herein for size reduction to −200 mesh, yielding an alloy having the following analysis:

| RAI McCreath |
|---|
| Al - 0.07% |
| C - 0.025% |
| Cr - 5.32% |
| Co - 6.23% |
| Fe - 6.04% |
| H - 0.659.% (from hydriding step) |
| Ni - 29.17% |
| N - 0.008% |
| O - 0.271% |
| P - 0.01% |
| Si - 0.100% |
| S - 0.001% |
| Ti - 12.53% |
| V - 17.53% |
| Zr - 22.00% |

The present invention has been described above in terms of representative embodiments which are illustrative, but not intended to be self limiting. The invention itself is defined more generally by the following claims and their equivalents While many objects and advantages of the invention have been set forth, it is understood that the invention is defined by the scope of the following claims, not by the objects and advantages.

I claim:

1. A process for preparing a master alloy for use in hydrogen storage battery electrodes, comprising the steps of:
   (a) preparing a first mixture of at least one metal and at least one metal oxide, both in powdered form, and Al in powdered or granular form, wherein said at least one metal and said at least one metal oxide are each independently selected from the group of metals consisting of Ni, V, Cr, Co, and Fe;
   (b) alloying said at least one metal and at least one metal oxide to produce an intermetallic compound in an aluminothermic reaction;
   (c) size reducing said intermetallic compound into powdered form;
   (d) preparing a second mixture of said powdered intermetallic compound and at least one additional metal or alloy in powdered form, wherein said at least one additional metal or alloy is selected from the group of metals consisting of Ni, Ti, Mn, Zr, Cr, Co, V and Fe;
   (e) pressing said second mixture in powdered form to produce a compact; and,
   (f) fusion heating said compact to produce a master alloy for use in hydrogen storage battery electrodes selected from the group of metals consisting of Ni, V, Cr. Co, Fe, Ti, Mn, and Zr.

2. The process according to claim 1, wherein said intermetallic compound of said alloying step (b) is produced from a first mixture of Al fines with Ni powder, Co powder, Fe powder, V$_2$O$_5$ powder and Cr$_2$O$_3$ powder.

3. The process according to claim 1, wherein said alloying step (b) occurs in an inert atmosphere.

4. The process according to claim 1, wherein said alloying step (b) occurs at a reduced pressure of about 0.3 mm Hg or less.

5. The process according to claim 1, wherein said alloying step (b) is performed in a water-cooled, copper, below-ground furnace.

6. The process according to claim 1, wherein said size reducing step (c) is performed by cooling said intermetallic compound and then size reducing said intermetallic compound by crushers, ball mills, pug mills, grinders or hydriding.

7. The process according to claim 1, wherein said compact of said pressing step (e) is formed using an isostatic press at a pressure in excess of 7,000 psi.

8. The process according to claim 7, wherein said compacts are formed in about ten pound discs and stacked intervals for the fusion heating step (f).

9. The process according to claim 1, wherein said fusion heating step (e) is by induction heating in an induction furnace.

10. The process according to claim 1, further comprising the step of:
(g) size reducing said master alloy to produce an end product in size reduced form.

11. The process according to claim 10, wherein said master alloy is size reduced by hydriding to about −200 mesh.

12. The process according to claim 1, wherein said intermetallic compound comprises about 8–18% Ni, about 38–48% V, about 8–18% Cr, about 10–20% Co, about 10–20% Fe, and less than about 0.5% of Al, C, N$_2$, O$_2$, P, Si, S and other impurities.

13. The process according to claim 1, wherein said master alloy for use in hydrogen storage battery electrodes comprises about 8–18% Ti, about 17–27% Zr, about 13–23% V, about 24–34% Ni, about 1–11% Cr, about 1–11% Co, and about 1–11% Fe.

14. The process according to claim 13, wherein said master alloy further comprises as low as about 0.025 % C.

15. A master alloy for use in hydrogen storage battery electrodes, comprising:
about 8–18% Ti, about 17–27% Zr, about 13–23% V, about 24–34% Ni, about 1–11% Cr, about 1–11% Co, and about 1–11% Fe.

16. The master alloy according to claim 15, wherein said master alloy further comprises as low as about 0.025% C.

17. The master alloy according to claim 16, wherein said master alloy is about 12.5% Ti, about 22% Zr, about 17.5% V, about 29.2% Ni, about 5.3% Cr, about 6.2% Co, about 6% Fe, and as low as about 0.025% C.

18. An intermetallic alloy used to produce a master alloy for use in hydrogen storage battery electrodes, comprising:
about 8–18% Ni, about 38–48% V, about 8–18% Cr, about 10–20% Co and about 10–20% Fe.

19. The intermetallic alloy according to claim 18, wherein said intermetallic compound further comprises less than about 0.5% of Al, C, N$_2$, O$_2$, P, Si, S and other impurities.

20. A hydrogen storage battery electrode, said electrode comprising a master alloy produced according to claim 6.

* * * * *

UNITED STATES PATENT AND TRADEMARK OFFICE
CERTIFICATE OF CORRECTION

PATENT NO. : 5,364,587
DATED : November 15, 1994
INVENTOR(S) : Perfect

It is certified that error appears in the above-indentified patent and that said Letters Patent is hereby corrected as shown below:

In column 3, line 50, change "12 5%" to read --12.5%--.

In column 4, lines 3-4, change "$Cr_2O_3$and" to read --$Cr_2O_3$, and--.

In column 4, line 35, insert --.-- after "equivalents--.

In Column 4, line 66, insert --,-- after "Cr"., delete the period --.--.

In Column 6, line 34, change "claim 6" to read --claim 1--.

Signed and Sealed this

Fourth Day of April, 1995

*Attest:*

BRUCE LEHMAN

*Attesting Officer*     *Commissioner of Patents and Trademarks*